United States Patent [19]

Nakano

[11] Patent Number: 4,905,529
[45] Date of Patent: Mar. 6, 1990

[54] FRICTION ROLLER TYPE CONTINUOUSLY VARIABLE TRANSMISSION

[75] Inventor: Masaki Nakano, Kawasaki, Japan

[73] Assignee: Nissan Motor Co., Ltd., Yokohama, Japan

[21] Appl. No.: 121,851

[22] Filed: Nov. 17, 1987

[30] Foreign Application Priority Data

Nov. 20, 1986 [JP] Japan ................................ 61-275197

[51] Int. Cl.[4] .......................... F16H 15/08; F16H 15/16
[52] U.S. Cl. .......................................... 74/201; 74/193;
74/606 R; 137/625.65
[58] Field of Search ................... 74/193, 199, 200, 201,
74/606 R; 137/625.65

[56] References Cited

U.S. PATENT DOCUMENTS

| 4,083,266 | 4/1978 | Kreitzberg | 74/606 R |
|---|---|---|---|
| 4,434,675 | 3/1984 | Kraus | 74/201 |
| 4,453,427 | 6/1984 | Kraus et al. | 74/200 |
| 4,464,978 | 8/1984 | Ichiryu et al. | 137/625.65 |
| 4,702,118 | 10/1987 | Kraus | 74/199 |

Primary Examiner—Leslie A. Braun
Assistant Examiner—Janice E. Chartoff
Attorney, Agent, or Firm—Foley & Lardner, Schwartz, Jeffery, Schwaab, Mack, Blumenthal & Evans

[57] ABSTRACT

Herein disclosed is a friction roller type continuously variable transmission which is compact in size. The transmission comprises a casing, input and output cone discs facing each other, two friction rollers each being operatively disposed between the input and output cone discs, two roller supporting members for rotatably supporting the friction rollers, first and second bearing supporting members each having opposed ends which are connected to one ends of the roller supporting members through respective bearings, first and second link posts supporting middle portions of the first and second bearing supporting members respectively, and a control valve body installing therein various control valves for controlling operation of the transmission, the control valve body being secured to the casing. In order to reduce the size of the entire construction of the transmission, the first link post is fixed to the casing, while the second link post is fixed to the control valve body.

6 Claims, 5 Drawing Sheets

FRICTION ROLLER TYPE CONTINUOUSLY VARIABLE TRANSMISSION

BACKGROUND OF THE INVENTION

1. Field of the Invention

The present invention relates in general to a continuously variable transmission and more particularly to a so-called friction gear type continuously variable transmission.

2. Description of the Prior Art

One of conventional friction gear type continuously variable transmission is disclosed in Japanese Patent First Provisional Publication No. 61-124753. The transmission comprises an input cone disc, an output cone disc, a pair of friction rollers frictionally engaged with both the input and output cone discs, two roller supporting members (trunnions) for rotatably supporting the friction rollers, a first bearing supporting member for rotatably supporting respective shaft portions of the roller supporting members through a bearing, a second bearing supporting member for rotatably supporting the other shaft portions of the roller supporting members through another bearing, a first link post for supporting a middle portion of the first bearing supporting member and a second link post for supporting a middle portion of the second bearing supporting member. The first link post and the second link post are both fixed to a casing of the transmission.

However, due to its inherency in construction, it is inevitably necessary to fix the second link post to a lower portion of the casing and to fix a control valve body to the casing below the second link post. This arrangement induces however a bulky construction, that is, increased height of the entire construction of the transmission thereby making the loading of the transmission onto a body of the vehicle difficult. Furthermore, since it is necessary to provide the casing with an integral downwardly extending wall to which the second link post is secured, casting of the casing is difficult or at least troublesome.

SUMMARY OF THE INVENTION

It is therefore an object of the present invention to provide an improved friction roller type continuously variable transmission which is free of the drawbacks encountered in the above-mentioned conventional transmission.

According to the present invention, there is provided a friction roller type continuously variable transmission which is constructed compact in size.

According to the present invention, there is provided a friction roller type continuously variable transmission wherein one of the link posts is supported by a control valve body secured to the casing of the transmission.

According to the present invention, there is provided a friction roller type continuously variable transmission which comprises a casing; input and output cone discs facing each other; a pair of friction rollers each having diametrically opposed sides frictionally engaged with the input and output cone discs respectively; two roller supporting members for rotatably supporting the friction rollers respectively; a first bearing supporting member having opposed ends which are connected to one ends of the roller supporting members through respective bearings; a second bearing supporting member having opposed ends which are connected to the other ends of the roller supporting members through respective bearings; a first link post for supporting a middle portion of the first bearing supporting member; a second link post for supporting a middle portion of the second bearing supporting member, and a control valve body installing therein various control valves for controlling operation of the transmission, the control valve body being secured to the casing, wherein the first link post is fixed to the casing, while the second link post is fixed to the control valve body.

DETAILED DESCRIPTION OF THE INVENTION

Figure 1:
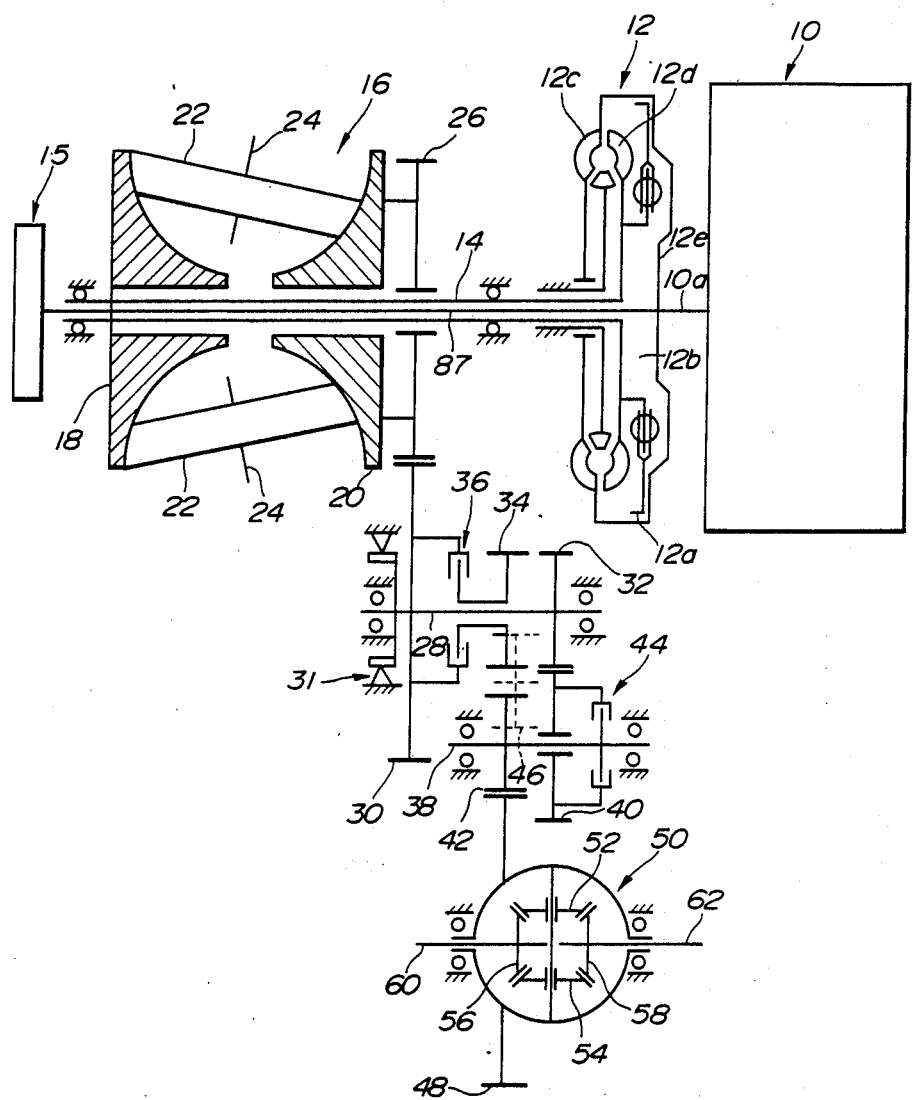
FIG. 1 is a schematically illustrated power train in which a friction roller type continuously variable transmission of the present invention is practically installed.

Referring to FIG. 1, there is shown a power train in which a friction roller type continuously variable transmission of the present invention is practically installed. Denoted by numeral 10 is an engine which has an output shaft 10a connected to a torque converter 12. The torque converter 12 is of a type having a lock-up clutch 12a, so that by controlling the fluid pressure in a lock-up operation chamber 12b, engagement and disengagement between a pump impeller 12c of the input side and a turbine runner 12d of the output side are selectively achieved. Designated by numeral 12e is a cover of the converter 12, which rotates together with the output shaft 10a and has an oil pump driving shaft 87 secured thereto. The driving shaft 87 is connected to an oil pump 15 to drive the same. The oil pump 15 is arranged at an opposite side of the torque converter 12 with respect to a friction roller type transmission 16 of the present invention which will be described in detail hereinafter. A turbine runner 12d of the torque converter 12 is connected to an input shaft 14 of hollow construction. The input shaft 14 is connected to the friction roller type continuously variable transmission 16.

The transmission 16 comprises generally an input cone disc 18, an output cone disc 20 and a pair of friction rollers 22 and 22 which transmit rotation of the input cone disc 18 to the output cone disc 20. The input and output cone discs 18 and 20 have toroidal work surfaces to which the friction rollers 22 and 22 are frictionally engaged. Each friction roller 22 has a rotation shaft 24 which is inclinable in a manner as will be clarified hereinafter. The input cone disc 18 is connected to the input shaft 14 to rotate therewith, and the output cone disc 20 is provided with an output gear 26. The gear 26 is meshed with an input gear 30 securedly mounted on an idler shaft 28.

The idler shaft 28 has a gear 32 fixed thereto, and another gear 34 rotatably disposed thereabout. A reverse clutch 36 is arranged to selectively engage the gear 34 with the input gear 30. Due to function of a one-way clutch 31 mounted to the casing of the transmission, the idler shaft 28 is permitted to rotate in only a forward direction. Arranged in parallel with the idler shaft 28 is another idler shaft 38 which has a gear 40 rotatably diposed thereabout and another gear 42 fixed thereto. A forward clutch 44 is arranged to selectively engage the gear 40 with the shaft 38. The gear 40 is meshed with the above-mentioned gear 32. The other gear 42 is engaged to the above-mentioned gear 34 through a reverse idler gear 46 which is shown by a phantom line in FIG. 1. The gear 42 is engaged with an input gear 48 of a differential gear mechanism 50.

The differential gear mechanism 50 comprises a pair of pinion gears 52 and 54 which are meshed with a pair of side gears 56 and 58. The side gears 56 and 58 are securely mounted on respective output shafts 60 and 62. When, thus, the forward clutch 44 is brought into an engaged condition, the output shafts 60 and 62 rotate in a forward direction, while, when the reverse clutch 36 is brought into an engaged condition, the output shafts 60 and 62 rotate in a reversed direction. As will be described in detail in the following, by controlling the frictional engagement between each friction roller 22 and each of the input and output cone discs 18 and 20, the speed change ratio can be continuously varied.

Figure 2:
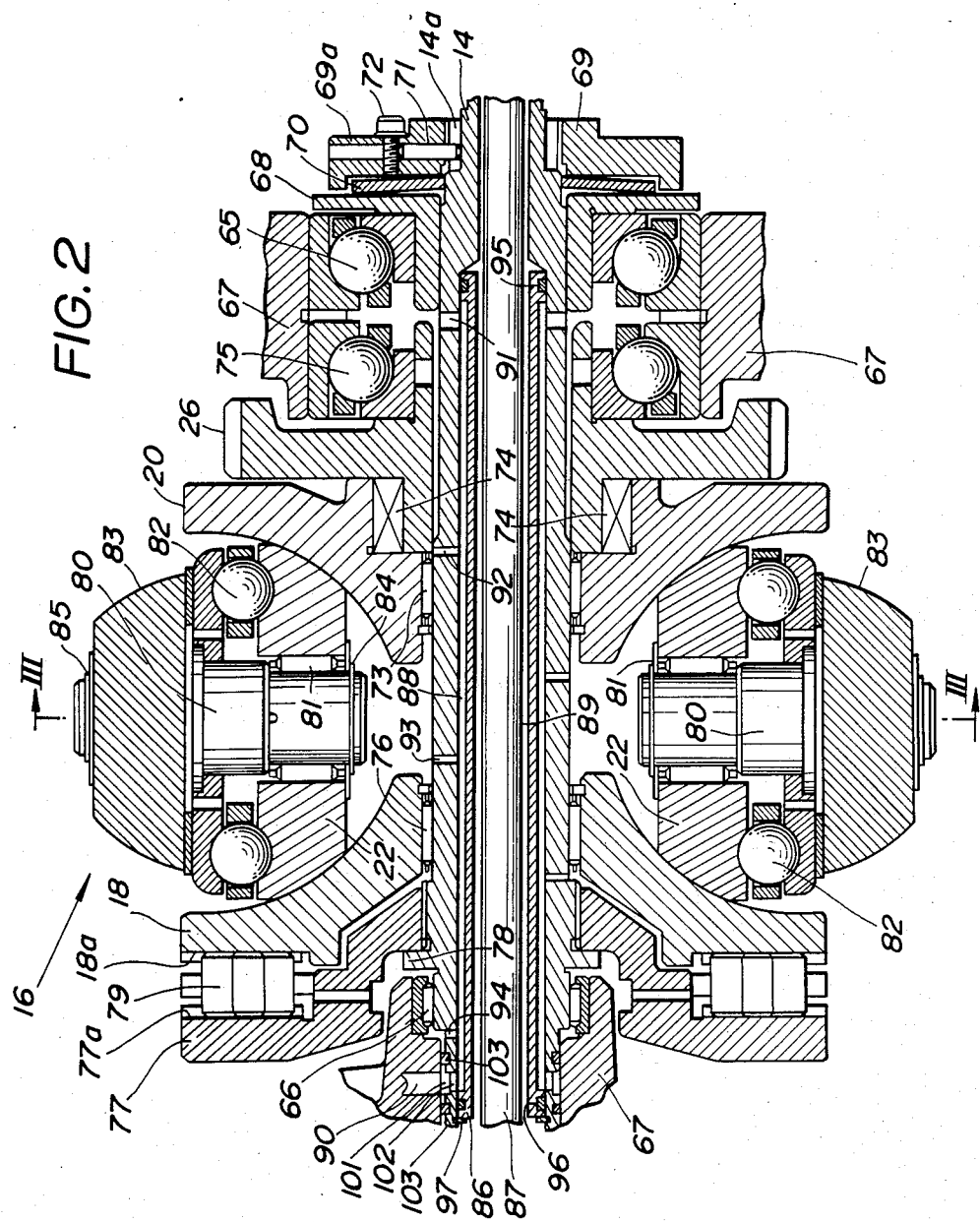
FIG. 2 is an axially sectional view of the transmission of the present invention.

Referring to FIG. 2, there is clearly shown the friction roller type continuously variable transmission 16. The input shaft 14 is rotatably supported by a casing 67 through a ball bearing 65 and a needle bearing 66. A spacer 68 is disposed between the input shaft 14 and the ball bearing 65. Between the spacer 68 and a loading nut 69 which is threadedly disposed on the input shaft 14, there is disposed a dish spring 70. With this arrangement, a counterforce of the dish spring 70 biases the input shaft 14 rightward in FIG. 2. The loading nut 69 is prevented from unfastening by a stopper pin 71 which has a leading end projected into a groove 14a of the output shaft 14. For selectively receiving therein the stopper pin 71, the loading nut 69 is formed with a plurality of bores 69a. The input shaft 14 is formed with a plurality of grooves 14a which are matable with the bores 69a. By suitably combining one bore 69a and one groove 14a, it becomes possible to make a fine adjustment of the fixed positioning of the loading nut 69 relative to the input shaft 14. A bolt 72 is connected to the nut 69 to suppress unfastening of the stopper pin 71.

The output cone disc 20 is rotatably disposed about the input shaft 14 through a bearing 73. The output disc 20 has the output gear 26 secured thereto through two keys 74 and 74. The output gear 26 is rotatably supported by the casing 67 through a ball bearing 75.

The input cone disc 18 is rotatably and axially slidably disposed about the input shaft 14 through a bearing 76. At a back side (that is, a left side in FIG. 2) of the input disc 18, there is arranged a cam flange 77. The cam flange 77 is splined to the input shaft 14 and suppressed from making excessive leftward movement by an annuler projection 78 formed on the input shaft 14.

Between the input cone disc 18 and the cam flange 77, there are arranged cam rollers 79 each being in contact with respective cam surfaces 18a and 77a of the input cone disc 18 and the cam flange 77, as shown in FIG. 2. The cam rollers 79 and the cam surfaces 18a and 77a are so arranged and constructed that when the cam flange 77 and the input disc 18 are rotated in opposite directions, the input disc 18 is biased rightward in FIG. 2.

Disposed between the input cone disc 18 and the output cone disc 20 are the friction rollers 22 and 22 which are arranged at diametrically opposed positions.

For operatively receiving the rollers therebetween, the discs 18 and 20 are formed at their facing sides with toroidal work surfaces. Each friction roller 22 is rotatably disposed on a shaft 80 through a bearing 81. Furthermore, each friction roller 22 is disposed on a ball bearing 82 which is, in turn, supported on a roller supporting member 83. Snap rings 84 and 85 are fixed to axial ends of the shaft 80 to hold the friction roller 22, the ball bearing 82 and the roller supporting member 83 in place.

Within the hollow input shaft 14, there is disposed a sleeve 86 which is held therein by means of a snap ring 97. The sleeve 86 is formed with diametrically enlarged both ends each having an O-ring 96 or 95 mounted thereon. Thus, there is defined a fluid passage 88 between the major cylindrical outer surface of the sleeve 86 and the cylindrical inner surface of the input shaft 14. The input shaft 14 is formed with axially spaced four openings 94, 93, 92 and 91 which are mated with the fluid passage 88. Furthermore, the input shaft 14 is formed with a groove 101 and an opening 102 through which a fluid from a bore 90 of the casing 67 is fed into the fluid passage 88. The groove 101 is sealed by seal rings 103 and 103.

Within the sleeve 86, there is disposed the drive shaft 87 for the oil pump 15 (see FIG. 1). There is formed, between the cylindrical inner surface of the sleeve 86 and the cylindrical outer surface of the drive shaft 87, a fluid passage 89 through which a fluid for controlling the lock-up operation of the torque converter 12 flows.

Figure 3:
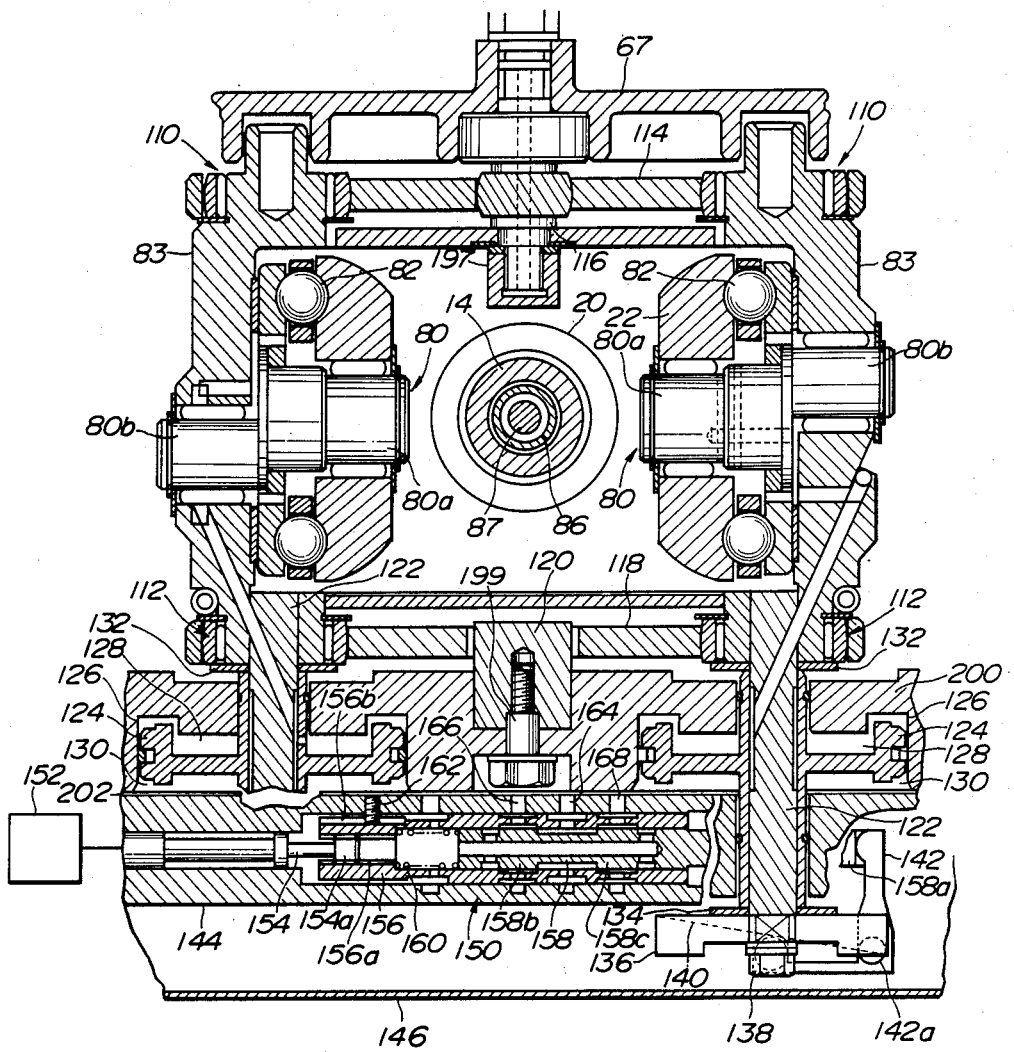
FIG. 3 is a sectional view taken along the line III—III of FIG. 2.

Referring to FIG. 3, there is shown a sectional view which is taken along the line III—III of FIG. 2. As is best understood from this drawing, each of the roller supporting members 83 is supported by roller bearings 110 and 112 in a manner to be rotatable and slidable in a vertical direction in FIG. 3. The roller bearing 110 is held by a first bearing supporting member 114 which is, in turn, held by a first link post 116 which is secured to the casing 67 by a nut 197. The other roller bearing 112 is held by a second bearing supporting member 118 which is, in turn, held by a second link post 120 which is secured to an upper control valve body 200 through a bolt 199. The upper control valve body 200 is fixed to the casing 67.

To a lower portion of each roller supporting member 83, there is mounted a shaft 122. Thus, the shaft 122 is rotatable together with the roller supporting member 83. About each shaft 122, there is disposed a piston 124 which is sealingly and slidably disposed in a corresponding cylinder 126 formed in the upper control valve body 200. First and second operation chambers 128 and 130 are thus defined in each cylinder 126, which are bounded by the piston 124. An upper end of the stem portion of each piston 124 engages the roller supporting member 83 with an interposal of a spacer 132 therebetween. While one of the stem portions of the pistons 124 has a lower end which has a cam 136 fixed thereto, a spacer 134 is disposed between the stem portion and the cam 136. The cam 136 is secured to the shaft 122 through a bolt 138, so that the cam 136 and the shaft 122 move or rotate together. It is to be noted that the other shaft 122 (that is, the shaft 122 as viewed in the left side of FIG. 2) has no member corresponding to the cam 136.

As may be understood from FIGS. 2 and 3, except the cam 136, essential parts including the friction rollers 22 and 22 and the roller supporting members 83 and 83 are arranged symmetrically with respect to the axis of the oil pump driving shaft 87.

As is seen from FIG. 3, an inward portion 80a of each shaft 80 which holds the corresponding friction roller 22 and an outward portion 80b of the same which is held by the corresponding roller supporting member 83 are eccentric to each other.

The cam 136 is formed at its lower side with an inclined surface 140 to which one end of a link 142 of bell-crank form contacts. The link 142 is pivotally connected at its fulcrum portion 142a to a lower control valve body 144. Thus, rotation of the cam 136 induces a pivotal movement of the link 142.

To a lower surface of the upper control valve body 200, there is attached the lower control valve body 144 with a separate plate 202 interposed therebetween. An oil pan 146 is connected to the casing 67 in a manner to cover the lower control valve body 144, the cam 136 and their associated parts.

A speed control valve 150 is arranged in the lower control valve body 144. The valve 150 comprises a driving rod 154 rotatably driven by an electric motor 152, a sleeve 156, a spool 158 disposed in the sleeve 156 and a spring 160 biasing the spool 158 rightward in FIG. 3. The driving rod 154 has an externally threaded leading end 154a which is operatively engaged with an internally threaded portion 156a of the sleeve 156. The sleeve 156 is formed with an axially extending groove 156b into which a pin 162 fixed to the lower control valve body 144 projects. Thus, upon rotation of the driving rod 154, the sleeve 156 moves in its axial direction without rotation about its axis. Due to the force of the biasing spring 160, a right end 158a of the sleeve 158 is pressed against the above-mentioned link 142. The spool 158 is formed with two spaced lands 158b and 158c for adjusting opening degrees of ports which are communicated with fluid passages 166 and 168 formed in the lower valve body 144. Under a stable condition, the spool 158 assumes a given position as shown in FIG. 3 supplying the fluid passages 166 and 168 with equal fluid pressure. While, under a non-stable condition, the spool 158 distributes a line pressure from the fluid passage 164 into the fluid passages 166 and 168 in accordance with the displacement thereof relative to the sleeve 156. The fluid passage 168 is led to both the upper operation chamber 128 of the right-positioned cylinder 126 and the lower operation chamber 130 of the left-positioned cylinder 126. The fluid passage 166 is led to the lower operation chamber 130 of the right-positioned cylinder 126 and the upper operation chamber 128 of the left-positioned cylinder 126.

Figure 4:
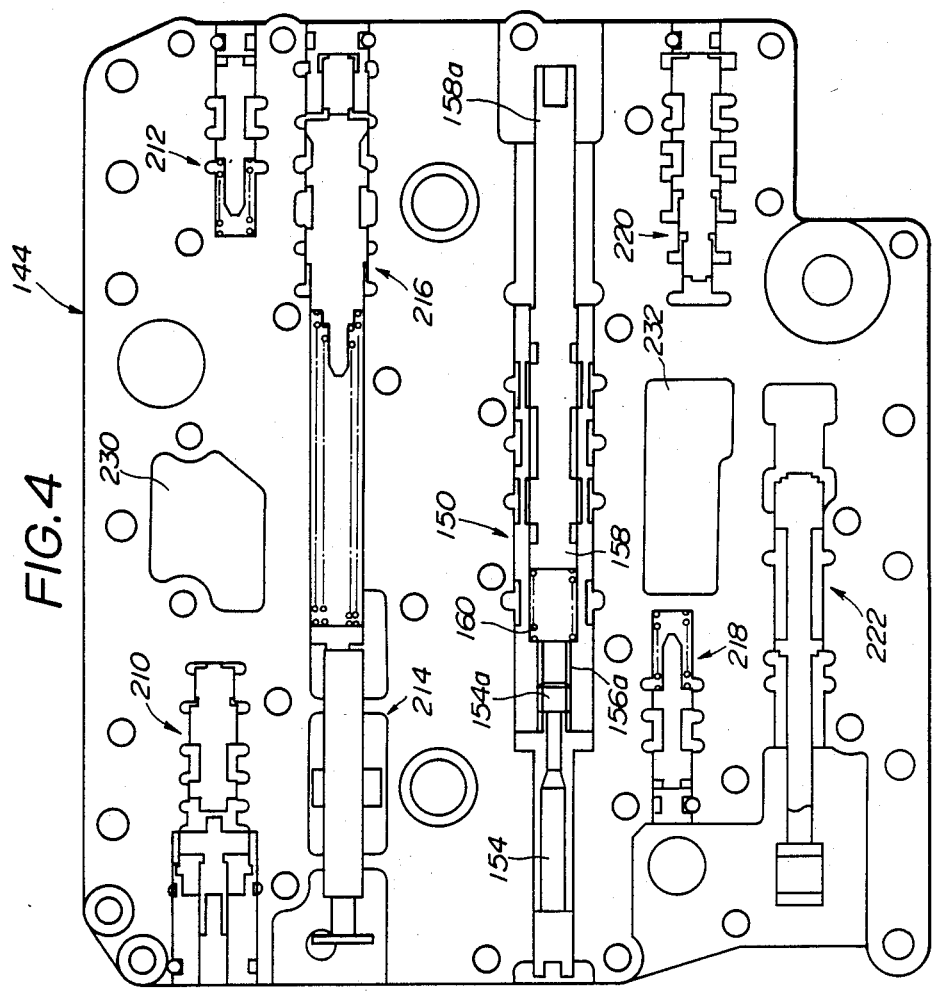
FIG. 4 is a plan view of a body in which various control valve installed.

In addition to the above-mentioned speed control valve 150, various valves 210, 212, 214, 216, 218, 220 and 222 are arranged in the lower control valve body 144, as is seen from FIG. 4. As shown, the bores for these valves are arranged in parallel with the bore for the speed control valve 150, that is, arranged perpendicular to the axis of the above-mentioned input shaft 14. The reason of these arrangements will be described hereinafter.

As is seen from FIG. 4, the lower control valve body 144 is formed with two apertures 230 and 232 which are respectively mated with corresponding apertures (not shown) formed in the upper control valve body 200. Through these apertures, lubrication oil flowing about the input and output cone discs 18 and 20 falls down into the oil pan 146.

In the following, operation of the transmission 16 will be described with reference to FIGS. 2 and 3.

For easy understanding, the description will be commenced with respect to a rest condition of the transmission 16. In this rest condition, the input shaft 14 is at a standstill allowing the biasing force of the dish spring 70 to be applied to the input disc 18 as an initial thrust.

When the input shaft 14 starts to rotate in response operation of the torque converter 12 (see FIG. 1), the cam roller 79 connects the cam flange 77 with the input cone disc 18 thereby causing rotation of the input disc 18. With this, a certain thrust is produced by the input cone disc, which corresponds to an input torque of the input shaft 14, so that each friction roller 22 is tightly sandwiched by the input and output cone discs 18 and 20 without slippage therebetween and thus assuredly rotated about the corresponding shaft 80. Thus, the power transmission from the input cone disc 18 to the output cone disc 20 is tightly carried out.

When now a speed change is required, the speed change motor 152 (see FIG. 3) is energized to rotate the driving rod 154 by a certain extent. With this, the sleeve 156 is moved rightward. Because the spool 158 does not move instantly, the movement of the sleeve 156 induces a change in relative positioning between the spool 158 and the sleeve 156, so that a passage from the fluid passage 164 to the fluid passage 168 is throttled, while a passage from the fluid passage 164 to the fluid passage 166 is enlarged. Thus, the pressure in the fluid passage 168 is reduced and the pressure in the fluid passage 166 is increased. Because the fluid passage 168 is communicated with the operation chamber 130 of the right-positioned cylinder 126 and the fluid passage 168 is communicated with the operation chamber 128 of the same cylinder 126, the piston 124 in the cylinder 126 is urged to move upward in FIG. 3. Since the communication of the operation chambers 128 and 130 of the left-positioned cylinder 126 relative to the fluid passages 168 and 166 is reversed to that of the right-positioned cylinder 126, the piston 124 in the left-positioned cylinder 126 is urged to move downward in the drawing. Thus, the right-positioned roller supporting member 83 is moved upward and the left-positioned roller supporting member 83 is moved downward in FIG. 3. With this, the direction of force tangentially applied to each friction roller 22 is changed, so that the right and left-positioned roller supporting members 83 and 83 are rotated in opposite directions with respect to the axes of the roller bearings 110 and 112. Thus, as may be understood from FIG. 2, the friction rollers 22 are inclined to assume an inclined position wherein each friction roller 22 has one peripheral side engaged with a smaller diameter portion of the input cone disc 18 and the other peripheral side engaged with a larger diameter portion of the output cone disc 20. Under this condition, speed reduction is carried out from the input cone disc 18 to the output cone disc 20.

The rotation of the right-positioned roller supporting member 83 is transmitted to the cam 136 via the associated shaft 122 thereby pivoting the link 142 about the fulcrum portion 142a. With this, the spool 158 is moved rightward in FIG. 3 causing the fluid pressures in the fluid passages 168 and 166 to become equal. When the fluid pressures become finally equal, the spool 158 becomes stable.

Thus, when, as is described hereinabove, the speed change motor 152 is energized for a given time, a desired speed change is achieved in the transmission 16.

When the speed change motor 152 is energized to rotate in a reversed direction, inclination of the friction rollers 22 and 22 is reversed with respect to the above-mentioned one.

During the above-mentioned speed change operation, the first link post 116 and the second link post 120 are applied with a considerable stress from the first bearing supporting member 114 and the second bearing supporting member 118 respectively. The stress applied to the first link post 116 is supported by the casing 67, while the stress applied to the second link post 120 is supported by the upper control valve body 200 and thus supported by the casing 67 to which said upper control valve body 200 is fixed. Since, as is described hereinabove, the second link post 120 is supported through the upper control valve body 200, it is unnecessary to provide the casing 67 with a downwardly extending wall by which the second link post 120 is to be supported. Accordingly, the entire construction of the upper and lower control valve bodies 200 and 144 can be reduced in size by a degree corresponding to the size of the downwardly extending wall. This means that the oil pan 146 can be constructed relatively thin as compared with that mounted to the above-mentioned conventional friction roller type continuously variable transmission. Of course, this induces a compact construction of the transmission 16 thereby not only facilitating loading of the same onto a body of an associated vehicle but also satisfying effective usage of limited part's space in the body.

Furthermore, the perpendicular arrangement of the bores for the various valves 150, 210, 212, 214, 216, 218, 220 and 222 relative to the input shaft 14 induces the following advantageous matter.

That is, during operation of the transmission 16, a counterforce is inevitably applied from the second bearing supporting member 118 to the second link post 120 in a direction parallel to the axis of the input shaft 14, which causes generation of small but non-negligible deformation in the upper and lower control valve bodies 200 and 144 in an up-and-down direction in FIG. 4. In order to minimize the degree influence of such deformation, the perpendicular arrangement of the valve bores relative to the input shaft 14 is employed. In fact, such arrangement induces smooth movements of the spools of the valves during operation of the transmission 16.

Figure 5:
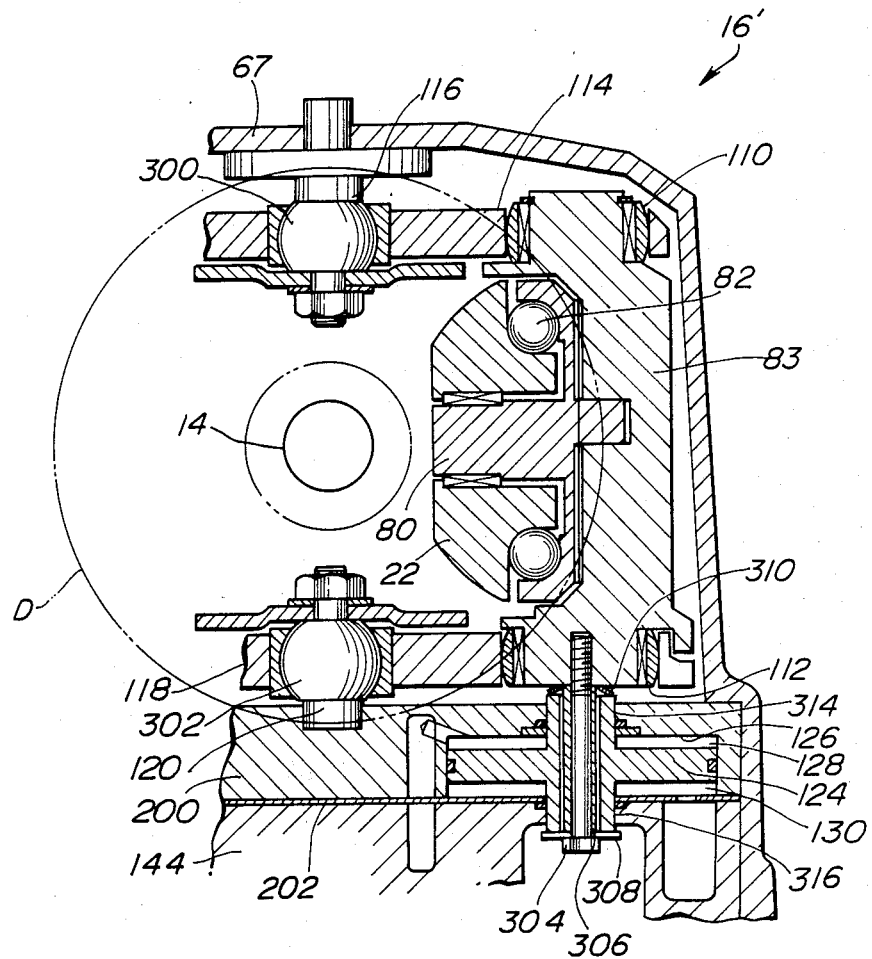
FIG. 5 is a sectional view similar to FIG. 3, but showing a second embodiment of the present invention with left-positioned parts being not illustrated for simplification of the drawing.

Referring to FIG. 5, there is shown a friction roller type continuously variable transmission 16' of a second embodiment of the present invention. For ease of description, substantially same parts as those in the aforementioned first embodiment will be denoted by the same numerals and detailed description of them will be omitted from the following.

Designated by numeral 14 is the input shaft which extends from a torque converter and is rotatably held in the casing 67 through bearing devices in such a manner as has been mentioned in the first embodiment. Designated by reference "D" is a trace described by the outer periphery of an input or output disc 18 or 20. Two roller supporting members 83 are arranged to face each other having first and second bearing supporting members 114 and 118 put therebetween. The bearing supporting members 114 and 118 are supported through respective ball joints 300 and 302 by first and second link posts 116 and 120. The first link post 116 is secured to the casing 67, while the second link post 120 is secured to an upper control valve body 200. Two pairs of roller bearings 110 and 112 are arranged to operatively connect the roller supporting members 83 with the bearing supporting members 114 and 118 in the afore-mentioned manner. Friction rollers 22 are rotatably mounted on the respective roller supporting members 83 through ball bearings 82. A lower valve body 144 is attached to the upper valve body 200 with an interposal of a separate plate 202 therebetween.

A bolt 304 is screwed to the right-positioned roller supporting member 83. A sleeve 306 is disposed about the bolt 304 to adjust an effective length of the same. A piston 124 is slidably disposed on the sleeve 306 in a manner to be axially movable relative to the sleeve 306. As shown, the piston 124 has a hollow stem portion (no numeral) through which the sleeve 306 passes. A washer 308 is interposed between the head of the bolt 304 and one axial end of the stem portion of the piston 124. A disc spring 310 is compressed between the other end of the stem portion and the roller supporting member 83, so that the piston 124 is biased downward in FIG. 5. The stem portion of the piston 124 is sealingly and slidably disposed in coaxially arranged bores 314 and 316 which are respectively formed in the upper and lower valve bodies 200 and 144. A cylinder 126 is formed in the upper valve body 200 at a position between the bores 314 and 316, in which a major part of the piston 124 is sealingly and slidably disposed. With this, first and second operation chambers 128 and 130 are defined in the cylinder 126.

It is to be noted that substantially same piston device is arranged at a left side of the above-mentioned piston 124 to actuate the other roller supporting member 83 (not shown).

Since the operation of the second embodiment 16' is substantially the same as that of the first embodiment 16, the description of it will be omitted.

What is claimed is:

1. A friction roller type continuously variable transmission comprising:
   a casing;
   input and output discs facing each other;
   a pair of friction rollers each having diametrically opposed sides frictionally engaged with said input and output discs respectively;
   two roller supporting members for rotatably supporting said friction rollers respectively;
   a first bearing supporting member having opposed ends which are connected to one ends of said roller supporting members through respective bearings;
   a second bearing supporting member having opposed ends which are connected to the other ends of said roller supporting member through respective bearings;
   a first link post for supporting a middle portion of said first bearing supporting member;
   a second link post for supporting a middle portion of said second bearing supporting member;
   a control valve body installing therein various control valves for controlling operation of the transmission, said control valve body being secured to said casing;
   said first link post being fixed to said casing, said second link post being fixed to said control valve body;
   a plurality of piston devices installed in said control valve body, said piston devices moving said roller supporting members when actuated;
   each of said piston devices comprising:

a piston sealingly and slidably disposed in a cylinder formed in said control valve body in a manner to define in the cylinder two operation chambers bounded by said piston;

a shaft slidably passing through a hollow formed in said piston and having one end connected to one of said roller supporting members; and wherein said piston has at least a portion which is projected outwardly from said control valve body to abut on said roller supporting member.

2. A friction roller type continuously variable transmission as claimed in claim 1 further comprising a link mechanism which comprises:

a cam secured to said shaft to move therewith;

a bell-crank lever pivotally connected to said valve control body, said lever having one end operatively engaged with said cam and the other end operatively connected to a part of a speed control valve arranged in said control valve body.

3. A friction roller type continuously variable transmission as claimed in claim 2 in which said speed control valve comprises:

a driving rod rotated by a motor;

a sleeve coaxially disposed in a bore formed in said control valve body, said sleeve being connected to said driving rod in such a manner that rotation of said driving rod about its axis being about an axial movement of said sleeve in said bores;

a spool axially slidably disposed in said sleeve, one end of said speed being in engagement with the other end of said bell-crank lever; and a spring disposed in said sleeve to bias said spool toward said bell-crank lever.

4. A friction roller type continuously variable transmission as claimed in claim 3, in which said spool has axially spaced two lands which can close fluid passages which lead to said operation chambers of said cylinder respectively.

5. A friction roller type continuously variable transmission comprising:

a casing;

input and output discs facing each other;

a pair of friction rollers each having diametrically opposed sides frictionally engaged with said input and output discs respectively;

two roller supporting members for rotatably supporting said friction rollers respectively;

a first bearing supporting member having opposed ends which are connected to one ends of said roller supporting members through respective bearings;

a second bearing supporting member having opposed ends which are connected to the other ends of said roller supporting member through respective bearings;

a first link post for supporting a middle portion of said first bearing supporting member;

a second link post for supporting a middle portion of said second bearing supporting member;

a control valve body installing therein various control valves for controlling operation of the transmission, said control valve body being secured to said casing;

said first link post being fixed to said casing, said second link post being fixed to said control valve body;

a plurality of piston devices installed in said control valve body, said piston devices moving said roller supporting members when actuated;

each of said piston devices comprising:

a piston having a hollow stem portion and sealingly and slidably disposed in a cylinder formed in said control valve body;

a bolt passing through said hollow stem portion of the piston and secured at its one end to one of said roller supporting members;

a sleeve coaxially disposed between said bolt and said hollow stem portion of the piston; and wherein one end of said stem portion is projected outwardly from said control valve body and is spaced from said roller supporting member through a biasing means which abuts said stem portion and said roller supporting member.

6. A friction roller type continuously variable transmission as claimed in claim 5 wherein said biasing means is dish spring which is compressed between siad one end of the stem portion and said roller supporting member.

* * * * *